(12) United States Patent
Yamazaki

(10) Patent No.: US 8,376,445 B2
(45) Date of Patent: Feb. 19, 2013

(54) VEHICLE INTERIOR PART, AND METHOD OF MANUFACTURING THEREOF, AND MOLD THEREOF

(75) Inventor: Yasunobu Yamazaki, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/089,388

(22) Filed: Apr. 19, 2011

(65) Prior Publication Data

US 2011/0193367 A1 Aug. 11, 2011

Related U.S. Application Data

(63) Continuation of application No. PCT/JP2009/068811, filed on Nov. 4, 2009.

(51) Int. Cl.
*B60K 37/00* (2006.01)
(52) U.S. Cl. ............ 296/70; 296/193.02; 296/901.01
(58) Field of Classification Search ........... 296/24.34, 296/37.3, 37.15, 70, 193.02, 901.01
See application file for complete search history.

(56) References Cited

U.S. PATENT DOCUMENTS

| | | | | |
|---|---|---|---|---|
| 3,356,409 A | * | 12/1967 | Belsky et al. | 296/24.34 |
| 4,421,343 A | * | 12/1983 | Yoshitsugu et al. | 280/752 |
| 5,061,002 A | * | 10/1991 | Saso | 296/37.3 |
| 5,164,254 A | * | 11/1992 | Todd et al. | 428/172 |
| 5,549,344 A | * | 8/1996 | Nishijima et al. | 296/70 |
| 5,556,153 A | * | 9/1996 | Kelman et al. | 296/70 |
| 5,709,601 A | * | 1/1998 | Heck | 454/121 |
| 5,762,395 A | * | 6/1998 | Merrifield et al. | 296/203.01 |
| 5,971,462 A | * | 10/1999 | Bell et al. | 296/37.3 |
| 6,071,591 A | * | 6/2000 | Dausch | 428/132 |
| 6,110,037 A | * | 8/2000 | Yoshinaka | 454/143 |
| 6,152,522 A | * | 11/2000 | Boulay et al. | 296/208 |
| 6,364,394 B1 | * | 4/2002 | Davis et al. | 296/70 |
| 6,378,934 B1 | * | 4/2002 | Palazzolo et al. | 296/208 |
| 6,409,590 B1 | * | 6/2002 | Suzuki et al. | 454/143 |
| 6,467,829 B2 | * | 10/2002 | Kaluszka et al. | 296/37.3 |
| 6,502,886 B1 | * | 1/2003 | Bleau et al. | 296/37.3 |
| 6,582,011 B2 | * | 6/2003 | Palazzolo et al. | 296/208 |
| 6,676,202 B2 | * | 1/2004 | Brancheriau | 296/208 |
| 6,705,672 B2 | * | 3/2004 | Shikata et al. | 296/208 |
| 6,799,786 B2 | * | 10/2004 | Hein | 296/70 |
| 6,883,861 B2 | * | 4/2005 | Laborie et al. | 296/208 |
| 6,932,402 B2 | * | 8/2005 | Niwa et al. | 296/24.34 |
| 6,942,910 B2 | * | 9/2005 | Roberts et al. | 428/35.8 |
| 7,866,722 B2 | * | 1/2011 | Shibata et al. | 296/24.34 |

FOREIGN PATENT DOCUMENTS

| | | |
|---|---|---|
| JP | 7-214655 | 8/1995 |
| JP | 10-250414 | 9/1998 |
| JP | 10-250499 | 9/1998 |
| JP | 11-334418 | 12/1999 |
| JP | 2000-289093 | 10/2000 |
| JP | 2001-213136 | 8/2001 |
| JP | 2001-239824 | 9/2001 |
| JP | 2001-353772 | 12/2001 |
| JP | 2009-39967 | 2/2009 |

* cited by examiner

*Primary Examiner* — Glenn Dayoan
*Assistant Examiner* — Paul Chenevert
(74) *Attorney, Agent, or Firm* — Finnegan, Henderson, Farabow, Garrett & Dunner, LLP

(57) ABSTRACT

A vehicle interior part comprises a blow molded portion that is molded in a hollow shape by a pair of resin sheets being blow molded and that includes joined portions of the pair of resin sheets, and vacuum molded portions that are molded by one of the pair of resin sheets being vacuum molded at outer sides of the blow molded portion.

11 Claims, 12 Drawing Sheets

VEHICLE INTERIOR PART, AND METHOD OF MANUFACTURING THEREOF, AND MOLD THEREOF

CROSS-REFERENCE TO RELATED APPLICATIONS

This application is a continuation application of PCT Application No. JP/2009/68811 filed on Nov. 4, 2009, which is incorporated herein by reference in its entirety.

BACKGROUND OF THE INVENTION

1. Technical Field

The present invention relates to a vehicle interior part that is molded by resin sheets.

2. Related Art

A duct-integral-type instrument panel structure in which an air conditioning duct is molded integrally is shown in Japanese Patent Application Laid-Open No. 10-250414. In the structure, a nozzle member that structures the rear surface of a defroster nozzle is joined in advance to the front side of a duct member that forms recessed-and-protruding shapes, and is joined to the reverse surface of an instrument panel.

In the aforementioned instrument panel structure, a flow adjusting portion of a narrow width is provided at the upper portion side (the blow-out port side) of the defroster nozzle. In such a defroster nozzle, because the flow speed of the air-conditioned air that is blown-out from the blow-out ports increases due to the flow-adjusting portion, the clearing performance of the defroster can be improved.

However, in the instrument panel structure as described above, because the air conditioning duct that is hollow is structured by using the reverse surface of the instrument panel, the design flexibility in the shape are low. Therefore, the shape of the defroster nozzle (the hollow portion) as described above can be realized by forming a nozzle member separately from the duct member and adding the nozzle member to the duct member afterward. Due thereto, the number of parts and the number of assembly processes increases, and manufacturing becomes complicated, and therefore, there is room for improving this.

SUMMARY

In view of the above-described circumstances, a subject of the present invention is to provide a vehicle interior part and a method of manufacturing thereof and a mold thereof that can easily manufacture and that can improve the design flexibility in the shape.

A vehicle interior part according to a first aspect of the invention has: a blow molded portion that is molded in a hollow shape by a pair of resin sheets being blow molded and that includes joined portions of the pair of resin sheets; and vacuum molded portions that are molded by one of the pair of resin sheets being vacuum molded at outer sides of the blow molded portion.

In the vehicle interior part of the first aspect, the blow molded portion is molded by the pair of resin sheets being blow molded and the blow molded portion includes joined portions of the pair of resin sheets, and the vacuum molded portions are molded by one of these resin sheets being vacuum molded at outer sides of the blow molded portion. Accordingly, the present vehicle interior part can be manufactured easily by blow molding and vacuum molding. Further, because the vehicle interior part has the blow molded portion that is hollow, the design flexibility in shape can be improved.

A vehicle interior part according to a second aspect of the invention has the feature that, in the vehicle interior part of the first aspect, the blow molded portion and the vacuum molded portions are molded simultaneously.

In the vehicle interior part of the second aspect, because the blow molded portion and the vacuum molded portions are molded simultaneously, the vehicle interior part can be manufactured extremely easily, and the manufacturing processes can be simplified.

A vehicle interior part according to a third aspect of the invention has the feature that, in the vehicle interior part of the first and second aspects, further has an instrument panel, wherein the vacuum molded portions are molded in hat shapes in cross-section and opening sides of the hat shapes in cross-section are joined to a reverse side of the instrument panel. Together with the instrument panel, the vacuum molded portions form side duct portions that lead air-conditioned air of a vehicle air conditioner to transverse direction end sides of a vehicle cabin. The blow molded portion has a defroster nozzle and a center duct. The defroster nozzle leads the air-conditioned air to a front windshield glass, and the center duct leads the air-conditioned air to a transverse direction central side of the vehicle cabin.

In the vehicle interior part of the third aspect, the side duct portions are formed by the vacuum molded portions which are molded in hat shapes in cross-section and are joined to the reverse side of the instrument panel. Therefore, the materials of the side duct portions can be reduced, and the cost and mass can be reduced. Further, because the defroster nozzle and the center duct, which are provided at the blow molded portion, are formed in hollow shapes by blow molding, the design flexibility in the shapes of the defroster nozzle and the center duct can be improved.

A vehicle interior part according to a fourth aspect of the invention has the feature that, in the vehicle interior part of the third aspect, hat-shaped cross-sectional portions, which are molded in hat shapes in cross-section are provided at end sides of the blow molded portion. The hat-shaped cross-sectional portions are continuous with the hat shapes in cross-sections of the vacuum molded portions. A blow molded portion interior and side duct portion interiors are communicated via the hat-shaped cross-sectional portions.

In the vehicle interior part of the fourth aspect, the blow molded portion interior and the side duct portion interiors are communicated via the hat-shaped cross-sectional portions that are provided at the end sides of the blow molded portion. Due thereto, the air-conditioned air that is supplied to the blow molded portion interior can be supplied to the side duct portion interiors. Further, because the hat-shaped cross-sectional portions of the blow molded portion are continuous with the hat-shapes in cross-sections of the vacuum molded portions, no seams arise between the both. Due thereto, the sealability of the side duct portions can be preferable.

A vehicle interior part according to a fifth aspect has the feature that, in the vehicle interior part of the fourth aspect, the hat-shaped cross-sectional portions are structured by joined portions of the pair of resin sheets, and communication holes, for communicating the blow molded portion interior and the side duct portion interiors, are formed in the other of the pair of resin sheets at regions adjacent to the hat-shaped cross-sectional portions.

In the vehicle interior part of the fifth aspect, due to the communication holes being formed in the other of the pair of resin sheets, the communicated state of the blow molded portion interior and the side duct portion interiors is ensured. Further, the hat-shaped cross-sectional portions, i.e., mouths of the blow molded portion are structured by joined portions of the pair of resin sheets and are continuous with the hat-shapes in cross-sections of the vacuum molded portions that structure the side duct portions. Due thereto, the rigidity of the mouths of the blow molded portion can be improved.

A vehicle interior part according to a sixth aspect of the invention has the feature that, in the vehicle interior part of the fifth aspect, flange portions, which are provided at opening sides of the hat-shaped cross-sectional portions, are joined to the reverse side of the instrument panel.

In the vehicle interior part according to the sixth aspect, the flange portions of the hat-shaped cross-sectional portions which are joined to the reverse side of the instrument panel are structured by joined portions of the pair of resin sheets. In the joined portions of the pair of resin sheets, the degree of extensibility of the resin sheets at the time of blow molding is small and the plate thicknesses are ensured. Due thereto, the rigidity of the flange portions of the hat-shaped cross-sectional portions can be ensured, and therefore, the sealability of the joined surfaces of the flange portions of the hat-shaped cross-sectional portions and the instrument panel can be preferable.

A vehicle interior part according to a seventh aspect has the feature that, in the vehicle interior part of the first and second aspects, the blow molded portion and the vacuum molded portions structure a floor portion of a luggage compartment, and the vacuum molded portions are supported by a vehicle body from a lower side, and the blow molded portion is supported by the vehicle body via the vacuum molded portions.

In the vehicle interior part of the seventh aspect, the regions that are supported by the vehicle body from the lower side, i.e., the regions that do not require rigidity, are molded simply by vacuum molding. Due thereto, a lightening of the weight and a decrease in the cost can be aimed for. Further, the region that is supported by the vehicle body via the vacuum molded portions, i.e., the region that is not directly supported by the vehicle body and therefore requires rigidity, is molded by blow molding. Due thereto, the needed rigidity can be ensured by the hollow cross-section of the blow molded portion.

A vehicle interior part according to a eighth aspect has the feature that, in the vehicle interior part of the first and second aspects, the blow molded portion and the vacuum molded portions structure a side wall of a console box, and the blow molded portion structures a duct portion that is provided at the side wall.

In the vehicle interior part of the eighth aspect, because the duct portion is structured by the blow molded portion that structures the side wall of the console box, the duct can be made integral with the side wall of the console box. Further, the rigidity of the side wall of the console box can be improved by the hollow cross-section of the blow molded portion (the duct portion).

A vehicle interior part according to a ninth aspect has the feature that, in the vehicle interior part of any one of the first to seventh aspects, at the pair of resin sheets, at least one of a material and a plate thickness before blow molding is mutually different.

In the vehicle interior part of the ninth aspect, by individually changing the material and the plate thickness before blow molding of each resin sheet, the rigidity and extending moldability and the like of each region of the blow molded portion can be set optimally in accordance with the needs.

A method of manufacturing a vehicle interior part according to a tenth aspect includes: molding a blow molded portion that is hollow by blow molding a pair of resin sheets and that includes joined portions of the pair of resin sheets; and molding vacuum molded portions by vacuum molding one of the pair of resin sheets at outer sides of the blow molded portion.

In the method of manufacturing a vehicle interior part of the tenth aspect, the vehicle interior part can be manufactured easily by blow molding and vacuum molding. Further, because the blow molded portion that is hollow is provided at the vehicle interior part, the design flexibility in the shape of the vehicle interior part can be improved.

A method of manufacturing a vehicle interior part according to a eleventh aspect has the feature that, in the vehicle interior part of the tenth aspect, the blow molding and the vacuum molding are carried out simultaneously.

In the method of manufacturing a vehicle interior part of the eleventh aspect, because blow molding and vacuum molding are carried out simultaneously, the vehicle interior part can be manufactured extremely easily, and the manufacturing processes can be simplified.

A method of manufacturing a vehicle interior part according to a twelfth aspect has the feature that, in the method of manufacturing a vehicle interior part of the tenth or eleventh aspect, further includes: at a time of the vacuum molding, molding the vacuum molded portions into hat shapes in cross-section; and, at a time of the blow molding, molding joined portions of the pair of resin sheets at end sides of the blow molded portion into hat shapes in cross-section and making hat shaped joined portions continuous with hat-shaped cross-sections of the vacuum molded portions; and, thereafter, forming communication holes in the other of the pair of resin sheets. The communication holes communicate inner sides of the hat-shaped cross-sections of the vacuum molded portions and a blow molded portion interior.

In the method of manufacturing a vehicle interior part of the twelfth aspect, in the vehicle interior part, the hat-shaped cross-sections that are formed at the end sides of the blow molded portion are continuous with the hat-shaped cross-sections of the vacuum molded portions. Such a vehicle interior part can be molded simultaneously or continuously. Further, the communication holes that are formed in the other of the pair of resin sheets communicate the inner sides of the hat-shaped cross-sections of the vacuum molded portions and the blow molded portion interior. Therefore, the vehicle interior part, in which the hat-shaped cross-sections and the hollow portion (the blow molded portion) are communicated, can be manufactured easily. Moreover, because the mouths of the blow molded portion, that are continuous with the hat-shaped cross-sections of the vacuum molded portions, are structured by joined portions of the pair of resin sheets, the rigidity of the mouths of the blow molded portion (the hollow portion) can be improved.

A mold for shaping a vehicle interior part according to a thirteenth aspect has: a first mold member; and a second mold member having a blow molding region that carries out blow molding in cooperation with the first mold member, and vacuum molding regions which are provided at outer sides of the blow molding region and which carry out vacuum molding. A width dimension of the first mold member is formed to be shorter than that of the second mold member.

In the mold for shaping a vehicle interior part of the thirteenth aspect, the blow molded portion that is hollow can be molded by blow molding the pair of resin sheets between the first mold member and the blow molding region of the second mold member. Further, the vacuum molded portions can be molded by vacuum molding one of the pair of resin sheets at the vacuum molding regions that are provided at the outer sides of the blow molding region. Due thereto, the vehicle interior part, that has the blow molded portion and the vacuum molded portions, can be manufactured easily. Further, because the blow molded portion that is hollow is provided at the vehicle interior part, the design flexibility in the shape of the vehicle interior part can be improved.

The vehicle interior part according to a fourteenth aspect has the feature that, in the vehicle interior part of the first aspect, a width dimension of another of the pair of resin sheets is set to be smaller than that of the one of the pair of resin sheets.

The method of manufacturing a vehicle interior part according to a fifteenth aspect has the feature that, in the method of manufacturing a vehicle interior part according to the tenth aspect, a width dimension of another of the pair of resin sheets is set to be smaller than that of the one of the pair of resin sheets.

The vehicle interior part according to a sixteenth aspect further comprising, in the vehicle interior part of the first aspect, an instrument panel, and the vacuum molded portions are formed in hat shapes in cross-section that open upward, and flange portions are provided at opening sides, and the flange portions are joined to a reverse surface of the instrument panel.

The method of manufacturing a vehicle interior part according to a seventeenth aspect has the feature that, in the method of manufacturing a vehicle interior part according to the tenth aspect, forming the vacuum molded portions in hat shapes in cross-section that open upward; providing flange portions at opening sides of the vacuum molded portions; and joining the flange portions to a reverse surface of an instrument panel.

The vehicle interior part according to a eighteenth aspect has the feature that, in the vehicle interior part of the third aspect, the opening sides of the vacuum molded portions are joined to the reverse side of the instrument panel via sheet-shaped sealing members that are heat insulating.

The vehicle interior part according to a nineteenth aspect has the feature that, in the vehicle interior part of the first aspect, a non-woven fabric is joined to another of the pair of resin sheets at a surface thereof at the side of the one of the pair of resin sheets.

The method of manufacturing a vehicle interior part according to a twentieth aspect has the feature that, in the method of manufacturing a vehicle interior part according to the tenth aspect, a non-woven fabric is joined to another of the pair of resin sheets at a surface thereof at the side of the one of the pair of resin sheets.

As described above, the vehicle interior part according to the first aspect of the invention can be easily manufactured by blow molding and vacuum molding, and can improve the design flexibility in shape of the vehicle interior part.

The vehicle interior part according to the second aspect of the invention can be manufactured extremely easily, and can simplify the manufacturing processes.

In the vehicle interior part according to the third aspect of the invention, due to the materials of the side duct portions being reduced, the cost and mass can be reduced, and the design flexibility in the shapes of the defroster nozzle and the center duct can be improved.

In the vehicle interior part according to the fourth aspect of the invention, the air-conditioned air that is supplied to the blow molded portion interior can be supplied to the side duct portion interiors, and the sealability of the side duct portions can be made preferable.

In the vehicle interior part according to the fifth aspect of the invention, the rigidity of the mouths of the blow molded portion can be improved while the communicated state of the blow molded portion interior and the side duct portion interiors is ensured.

In the vehicle interior part according to the sixth aspect of the invention, the sealability of the joined surfaces of the flange portions of the hat-shaped cross-sectional portions and the instrument panel can become preferable.

In the vehicle interior part according to the seventh aspect of the invention, the structure of the floor portion of the luggage compartment can be made to be lighter-weight at a lower cost, and the needed rigidity can be ensured.

In the vehicle interior part according to the eighth aspect of the invention, the duct can be made integral with the side wall of the console box, and the rigidity of the side wall of the console box can be improved.

In the vehicle interior part according to the ninth aspect of the invention, the rigidity and extending moldability and the like of each region of the blow molded portion can be set optimally in accordance with the needs.

In the method of manufacturing a vehicle interior part according to the tenth aspect of the invention, the vehicle interior part can be manufactured easily by blow molding and vacuum molding, and the design flexibility in the shape of the vehicle interior part can be improved.

In the method of manufacturing a vehicle interior part according to the eleventh aspect of the invention, the vehicle interior part can be manufactured extremely easily, and the manufacturing processes can be simplified.

In the method of manufacturing a vehicle interior part according to the twelfth aspect of the invention, the vehicle interior part, in which the hat-shaped cross-sections and the hollow portion are communicated with one another, can be manufactured easily, and the rigidity of the mouths of the hollow portion can be improved.

In the mold for shaping a vehicle interior part according to the thirteenth aspect of the invention, the vehicle interior part that has the blow molded portion and the vacuum molded portions can be manufactured easily, and the design flexibility in shape of the vehicle interior part can be improved.

DETAILED DESCRIPTION OF THE INVENTION

<First Embodiment>

Hereinafter, a duct-integral-type instrument panel structural body 10 that serves as a vehicle interior part relating to a first embodiment of the present invention, and a method of manufacturing thereof and a mold 12 thereof are described with reference to FIG. 1 to FIG. 8. Note that arrow FR shown in FIG. 1 and FIG. 2 indicates the vehicle forward direction, arrow UP indicates the vehicle upward direction, and arrow IN indicates the vehicle transverse inner side direction.

Figure 1:
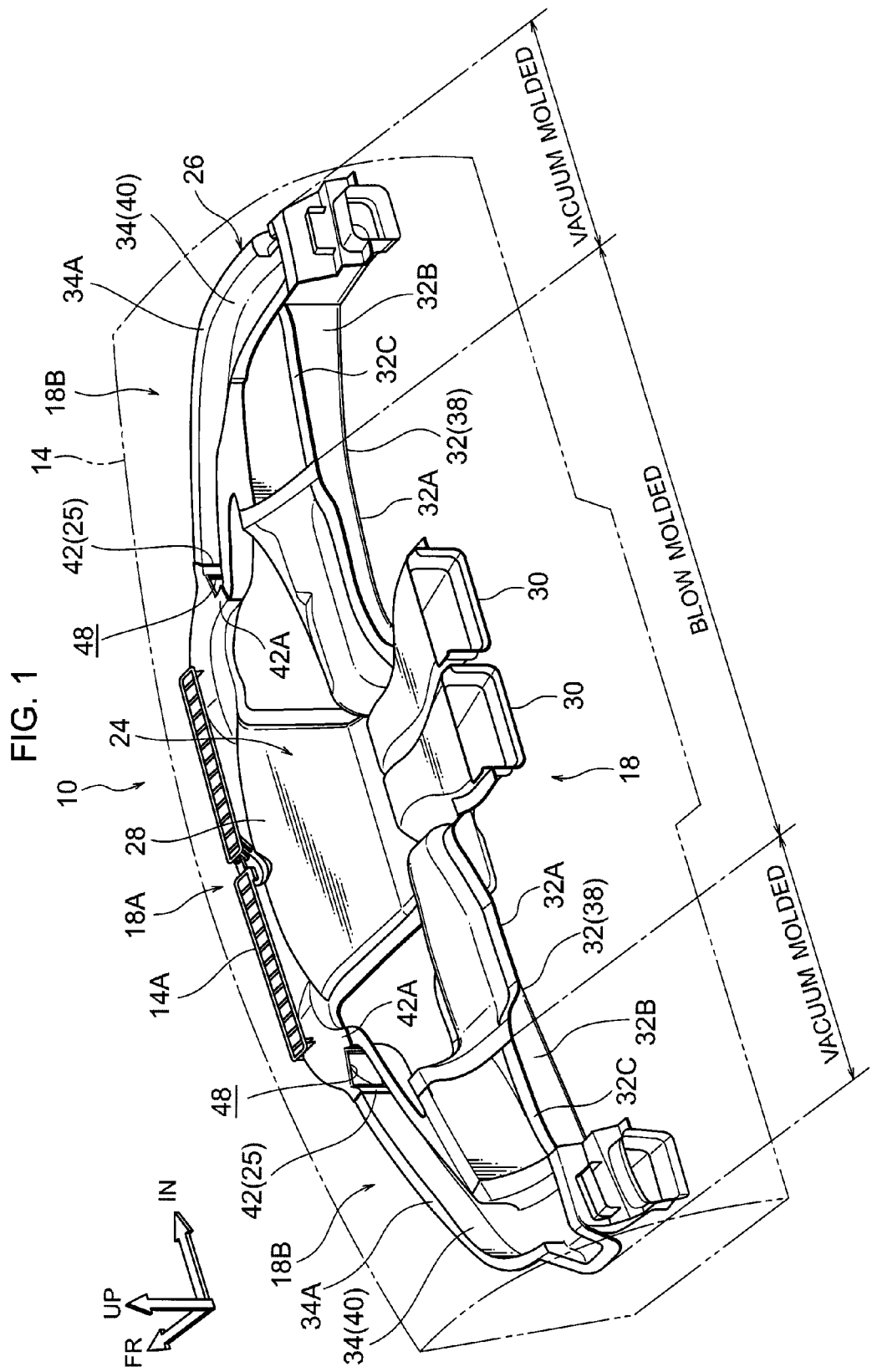
FIG. 1 is a schematic perspective view showing a duct-integral-type instrument panel structural body relating to a first embodiment of the present invention.
Figure 2:
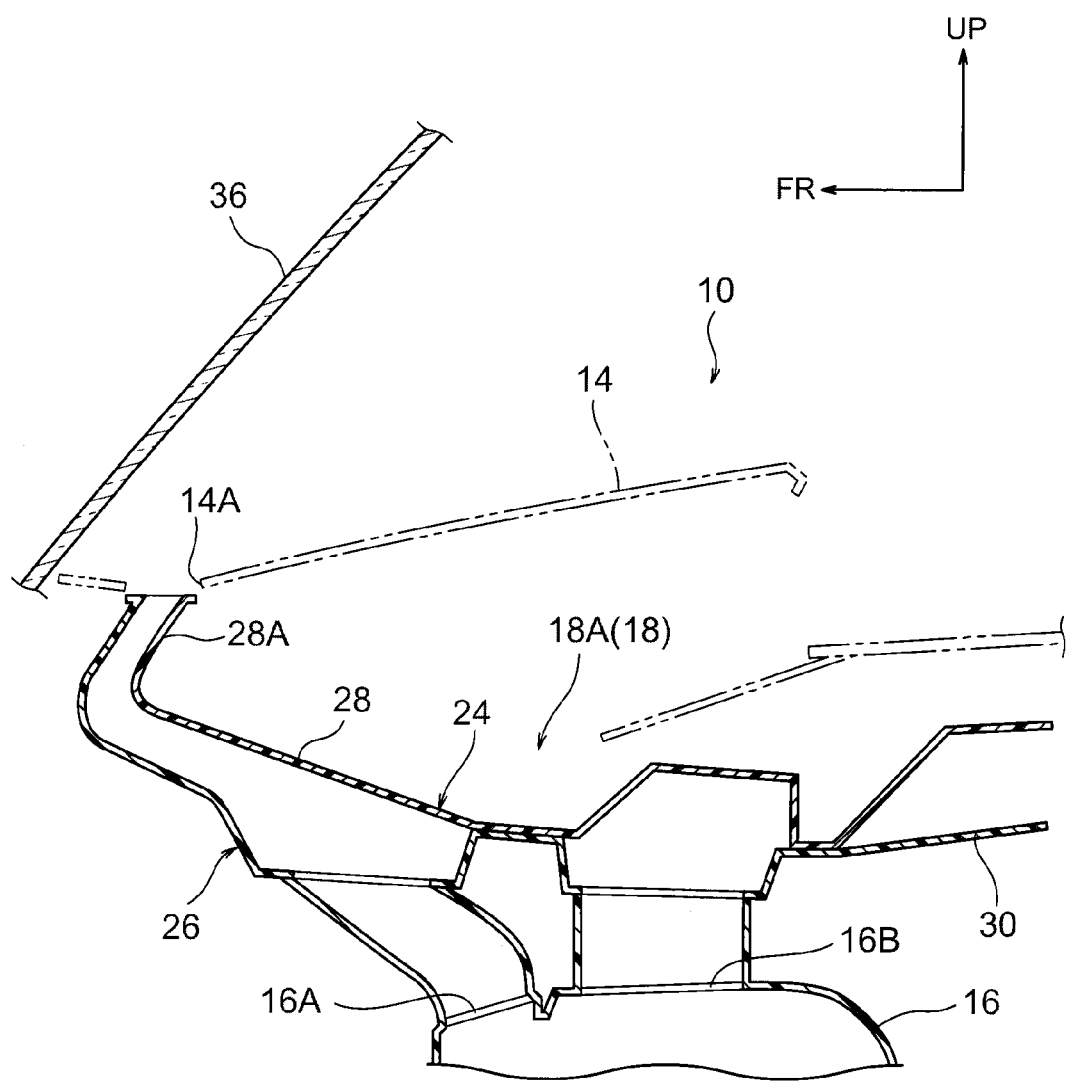
FIG. 2 is a schematic longitudinal sectional view showing a partial structure of a vehicle body front portion that includes main portions of the duct-integral-type instrument panel structural body shown in FIG. 1.

As shown in FIG. 1 and FIG. 2, the duct-integral-type instrument panel structural body 10 relating to the present embodiment has an instrument panel 14, and, at the inner side of the instrument panel 14, a duct structural body 18 that is disposed at the upper side of a vehicle air conditioner 16 (not shown in FIG. 1) at the inner side of the instrument panel 14. Note that, in addition to a simple cooling, dehumidifying device, for example, an HVAC (Heat Ventilating Air Conditioning) unit is used as the vehicle air conditioner 16.

The duct structural body 18 integrally has a blow molded portion 18A that is molded by blow molding, and a pair of left and right vacuum molded portions 18B that are molded by vacuum molding at the outer sides of the blow molded portion 18A. The outer sides of the blow molded portion 18A here, the left and right both sides of the blow molded portion 18A are regions that are not blow molded. First, the mold 12 and the method of manufacturing the duct structural body 18 are described.

(Mold 12 and Manufacturing Method of Duct Structural Body 18)

Figure 3:
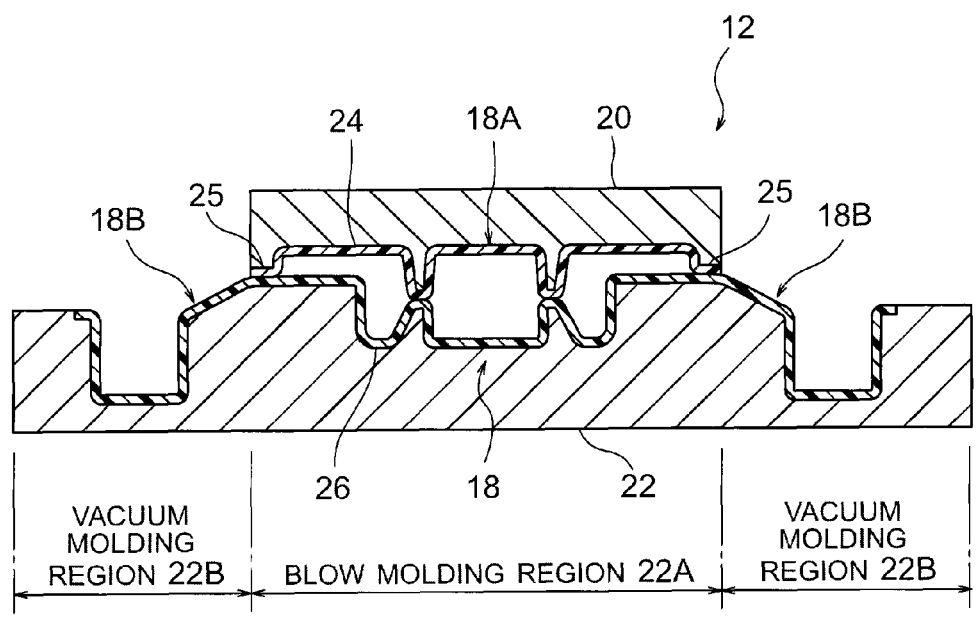
FIG. 3 is a schematic longitudinal sectional view showing a molding mold of the duct structural body shown in FIG. 1.

The duct structural body 18 is molded by the mold 12 shown in FIG. 3. The mold 12 is structured to include a first mold member 20, and a second mold member 22 that is disposed at the lower side of the first mold member 20. The width dimension (the dimension in the left-right direction in FIG. 3) of the first mold member 20 is formed to be shorter than the second mold member 22, and the first mold member 20 faces the transverse direction central portion of the second mold member 22.

The bottom surface (molding die surface) of the first mold member 20 is formed in recessed-and-protruding shapes that correspond to the shape of the top surface of the blow molded portion 18A of the duct structural body 18. Plural unillustrated vacuum suction paths are provided in the first mold 20. One end side of each vacuum suction path opens at the bottom surface of the first mold member 20, and the other end side is connected to an unillustrated vacuum suction source.

On the other hand, at the second mold member 22, the transverse direction central portion that faces the first mold member 20 is made to be a blow molding region 22A, and the transverse direction both sides of the blow molding region 22A are respectively made to be vacuum molding regions 22B. The top surface (molding die surface) of the blow molding region 22A is formed in recessed-and-protruding shapes that correspond to the shape of the bottom surface of the blow molded portion 18A of the duct structural body 18. Further, the top surfaces (molding die surfaces) of the respective vacuum molding regions 22B are formed in recessed-and-protruding shapes that correspond to the shapes of the bottom surfaces of the vacuum molded portions 18B of the duct structural body 18. Namely, the top surface of the second mold member 22 is formed in recessed-and-protruding shapes that correspond to the shape of the bottom surface of the duct structural body 18.

In the same way as the first mold member 20, plural unillustrated vacuum suction paths are provided in the second mold member 22. One end side of each vacuum suction path opens at the top surface of the second mold member 22, and the other end side of each vacuum suction path is connected to the unillustrated vacuum suction source.

Here, when the duct structural body 18 is molded, as shown in FIG. 3, a pair of resin sheets 24, 26 that are formed from thermoplastic resin are sandwiched between the first mold member 20 and the second mold member 22. Note that, in FIG. 3, the state after molding is illustrated, but the resin sheets 24, 26 are, before molding, formed in flat-plate shapes that do not have recesses and protrusions. Further, in the present first embodiment, the materials and the plate thicknesses before molding of the pair of resin sheets 24, 26 are common.

The width dimension of the resin sheet 24, that is disposed at the upper side (the first mold member 20 side), is set to be smaller than the resin sheet 26 that is disposed at the lower side (the second mold member 22 side), and the resin sheet 24 is interposed between the first mold member 20 and the second mold member 22. An unillustrated non-woven fabric is joined to the bottom surface (the surface at the resin sheet 26 side) of the resin sheet 24.

The width dimension of the resin sheet 26 that is disposed at the lower side is set to be large in correspondence with the width dimension of the second mold member 22. The transverse direction central portion of the resin sheet 26 is disposed so as to oppose the blow molding region 22A of the second mold member 22, and the transverse direction both sides are disposed so as to oppose the left and right vacuum molding regions 22B of the second mold member 22.

Before the above-described resin sheets 24, 26 are sandwiched between the first mold member 20 and the second mold member 22, the resin sheets 24, 26 are heated in advance by an unillustrated electric heater or the like. Then, at a time when the resin sheets 24, 26 have softened due to this heating, by forcibly blowing a gas in between the resin sheets 24, 26 from an unillustrated air jetting nozzle, the resin sheets 24, 26 are gradually made to swell upward and downward. Next, in the state in which the aforementioned vacuum suction source is operated, the resin sheets 24, 26 are drawn to be held by the first mold member 20 and the second mold member 22.

Due thereto, as shown in FIG. 3, the resin sheet 24 at the upper side fits tightly to the bottom surface of the first mold member 20, and the configuration of the top surface of the blow molded portion 18A is imparted thereto, and the transverse direction central portion of the resin sheet 26 at the lower side fits tightly to the top surface of the blow molding region 22A of the second mold member 22, and the configuration of the bottom surface of the blow molded portion 18A is imparted thereto. Further, at this time, the transverse direction both sides of the resin sheet 26 at the lower side fit tightly to the top surfaces of the left and right vacuum molding regions 22B of the second mold member 22, and the configurations of the pair of left and right vacuum molded portions 18B are imparted thereto. Moreover, at this time, at plural places including the transverse direction both end portions of the blow molded portion 18A, the resin sheets 24, 26 are nipped in a tight-fitting manner and fuse by themselves. Due thereto, the duct structural body 18 is molded.

(Structure of Duct Structural Body 18)

Next, the structure of the duct structural body 18 is described.

As shown in FIG. 1, the duct structural body 18 integrally has a defroster nozzle 28, a pair of left and right center ducts 30, a pair of left and right side duct main body structural portions 32, and a pair of left and right side defroster duct structural portions 34. Note that the pair of left and right side duct main body structural portions 32 and the pair of left and right side defroster duct structural portions 34, together with the instrument panel 14, configure side duct portions including side duct main bodies 38 and side defroster ducts 40.

The defroster nozzle 28 is provided at the blow molded portion 18A of the duct structural body 18. This defroster nozzle 28 is a so-called flow-speed-type defroster nozzle, and is formed in a hollow shape, and is disposed at the vehicle transverse direction central portion. A flow regulating portion 28A, that has a narrow width as seen from the vehicle transverse direction, is provided at the upper portion of the defroster nozzle 28 as shown in FIG. 2. This flow regulating portion 28A is inclined toward the vehicle rear side so as to run along a front windshield glass 36, and the opening portion at the top end side is disposed so as to face front defroster blow-out ports 14A that are provided in the front end portion of the instrument panel 14.

Further, the bottom end side of the defroster nozzle 28 communicates with a first air feeding port 16A of the vehicle air conditioner 16, and air-conditioned air that is fed from the first air feeding port 16A flows into the defroster nozzle 28. When the air-conditioned air that has flowed into the defroster nozzle 28 passes the flow regulating portion 28A, the flow speed is increased, and the air-conditioned air rushes to blown-out toward the front windshield glass 36 from the front defroster blow-out ports 14A of the instrument panel 14.

The pair of left and right center ducts 30 is provided at the blow molded portion 18A of the duct structural body 18. These center ducts 30 are formed in tube shapes, and extend from the rear end side of the defroster nozzle 28 toward the vehicle rear side, and span between unillustrated center registers provided at the vehicle transverse direction central portion of the instrument panel 14 and a second air feeding port 16B of the vehicle air conditioner 16. Due thereto, the air-conditioned air that is fed from the second air feeding port 16B is led by the respective center ducts 30 to the transverse direction central portion side of the vehicle cabin.

The pair of left and right side duct main body structural portions 32 extend in the vehicle transverse direction, and vehicle transverse direction inner side portions 32A that belong to the blow molded portion 18A are formed in tube shapes, and vehicle transverse direction outer side portions 32B that belong to the vacuum molded portions 18B are formed in hat shapes in cross-section that open toward the upper side. At these side duct main body structural portions 32, flange portions 32C provided at the opening sides of the vehicle transverse direction outer side portions 32B are joined to the reverse surface of the instrument panel 14, and the side duct main body structural portions 32, together with the instrument panel 14, configure the side duct main bodies 38. The side duct main bodies 38 span between unillustrated side registers, that are provided at the vehicle transverse direction outer side portions of the instrument panel 14, and the second air feeding port 16B of the vehicle air conditioner 16, and lead the air-conditioned air, that is fed from the second air feeding port 16B, to the transverse direction end sides of the vehicle cabin.

The pair of left and right side defroster duct structural portions 34 extend in the vehicle transverse direction at the vehicle front side of the pair of left and right side duct main body structural portions 32, and span between the unillustrated side defroster blow-out ports, that are provided at the vehicle transverse direction outer side end portions of the instrument panel 14, and the vehicle transverse direction outer side end portions of the defroster nozzle 28. These side defroster duct structural portions 34 belong to the vacuum molded portions 18B and are formed in hat shapes in cross-section that open upward, and flange portions 34A that are provided at the opening sides are joined to the reverse surface of the instrument panel 14. Due thereto, the side defroster ducts 40 are formed by the respective side defroster duct structural portions 34 and the instrument panel 14.

Figure 4:
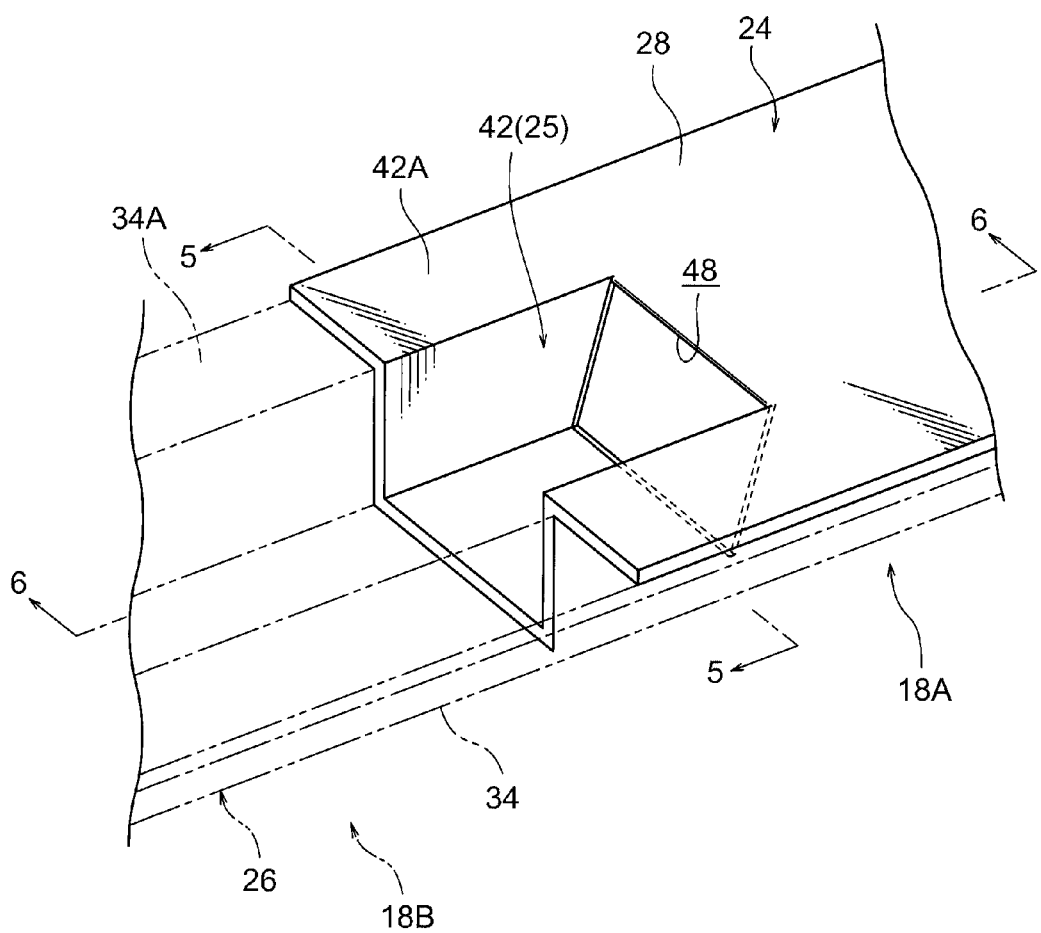
FIG. 4 is a schematic perspective view showing a partial structure of the duct structural body shown in FIG. 1.
Figure 5:
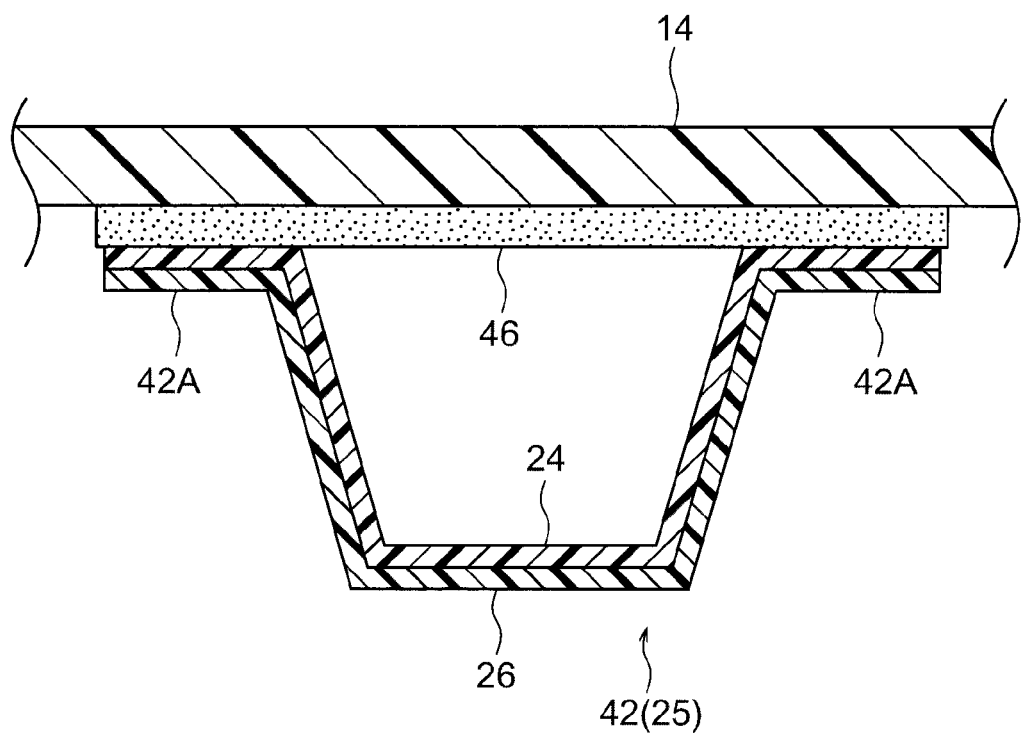
FIG. 5 is an enlarged sectional view showing a cut cross-section that is cut along line 5-5 of FIG. 4.

As shown in FIG. 4, hat-shaped cross-sectional portions 42, that are molded in hat shapes in cross-section and that are continuous with the hat-shaped cross-sections of the side defroster duct structural portions 34, are provided at the vehicle transverse direction outer side end portions of the defroster nozzle 28 (the end portion of the blow molded portion 18A). The proximal ends of the side defroster duct structural portions 34 are connected to the vehicle transverse direction outer side end portions of the defroster nozzle 28. As shown in FIG. 5, these hat-shaped cross-sectional portions 42 are structured by joined portions 25 of the pair of resin sheets 24, 26, i.e., portions where the pair of resin sheets 24, 26 are pressed and fuse by themselves at the time of blow molding.

At the hat-shaped cross-sectional portions 42, flange portions 42A provided at the opening sides are joined to the reverse surface of the instrument panel 14 via sheet-shaped sealing members 46. The sealing members 46 are made of a foamed material, and improve the heat insulating ability of the side defroster ducts. Note that, although not illustrated, similar sealing members are provided between the vehicle transverse direction outer side portions 32B of the side duct main body structural portions 32 and the instrument panel 14, and between the side defroster duct structural portions 34 and the instrument panel 14 as well.

Figure 6:
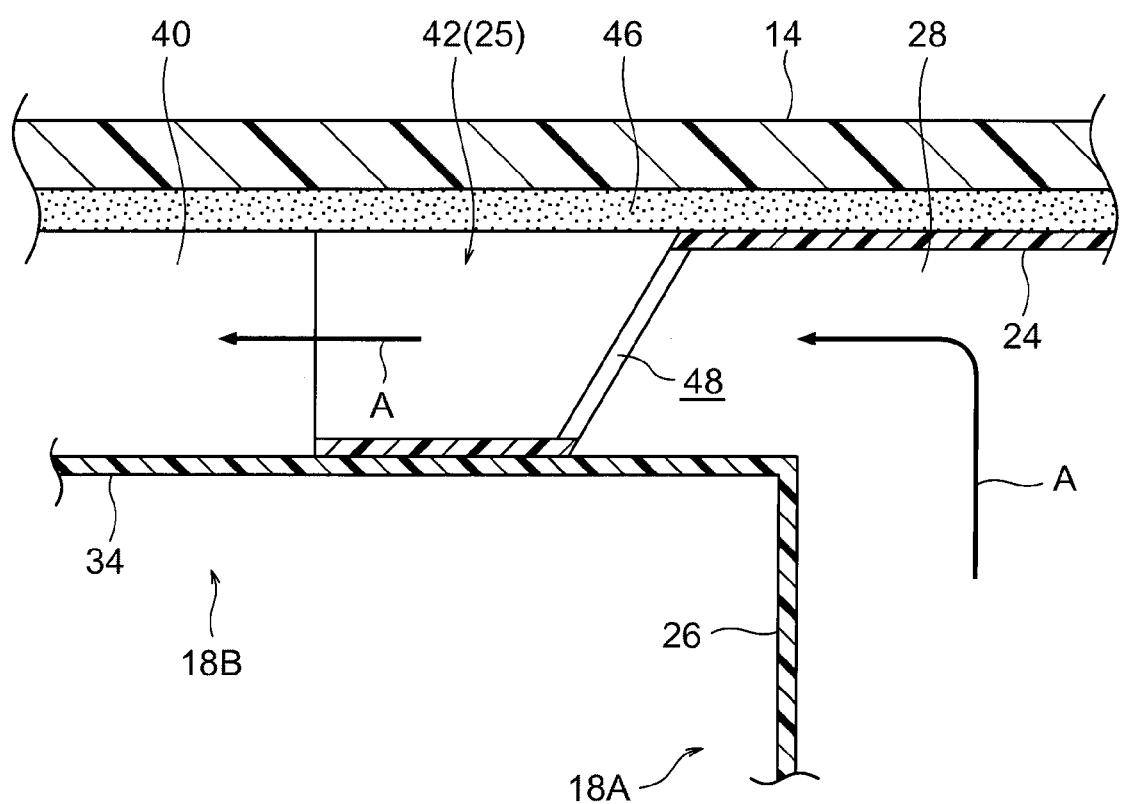
FIG. 6 is an enlarged sectional view showing a cut cross-section that is cut along line 6-6 of FIG. 4.

Further, as shown in FIG. 4 and FIG. 6, rectangular communication holes 48 are formed in the resin sheet 24 at the upper side in the regions that are adjacent to the hat-shaped cross-sectional portions 42 (the regions that face the inner sides of the hat-shaped cross-sectional portions 42). The inner sides of the hat-shaped cross-sectional portions 42 and the defroster nozzle 28 interior are communicated via these communication holes 48. Due thereto, the defroster nozzle 28 interior and the side defroster duct 40 interiors are communicated via the hat-shaped cross-sectional portions 42, and a portion of the air-conditioned air that is supplied to the defroster nozzle 28 interior flows into the side defroster ducts 40 (see arrows A in FIG. 6). The air-conditioned air that has flowed into the side defroster ducts 40 is blown-out toward the front side windows (not illustrated) of the vehicle from the aforementioned side defroster blow-out ports.

Figure 7:
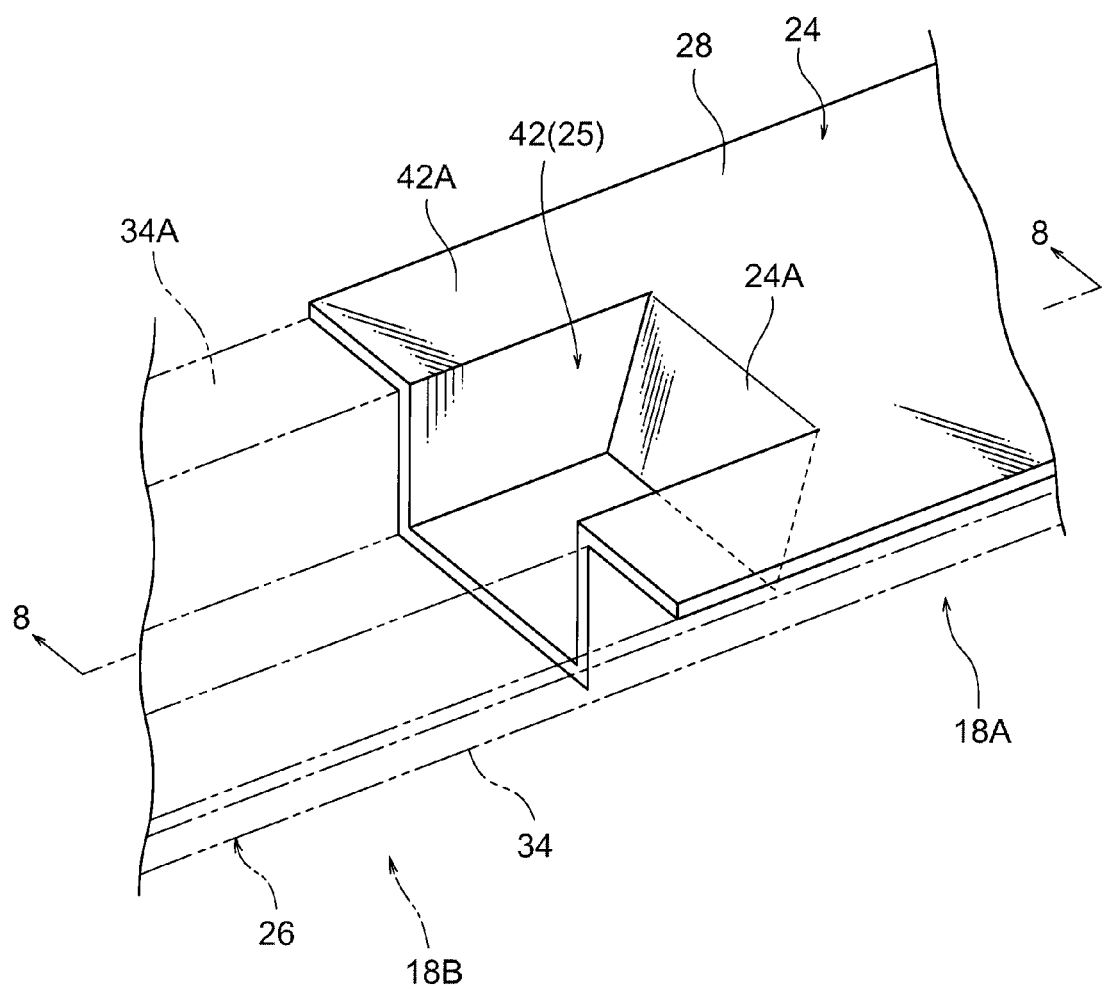
FIG. 7 is a perspective view corresponding to FIG. 4, and is a drawing showing a hat-shaped cross-sectional portion before a communication hole is formed.
Figure 8:
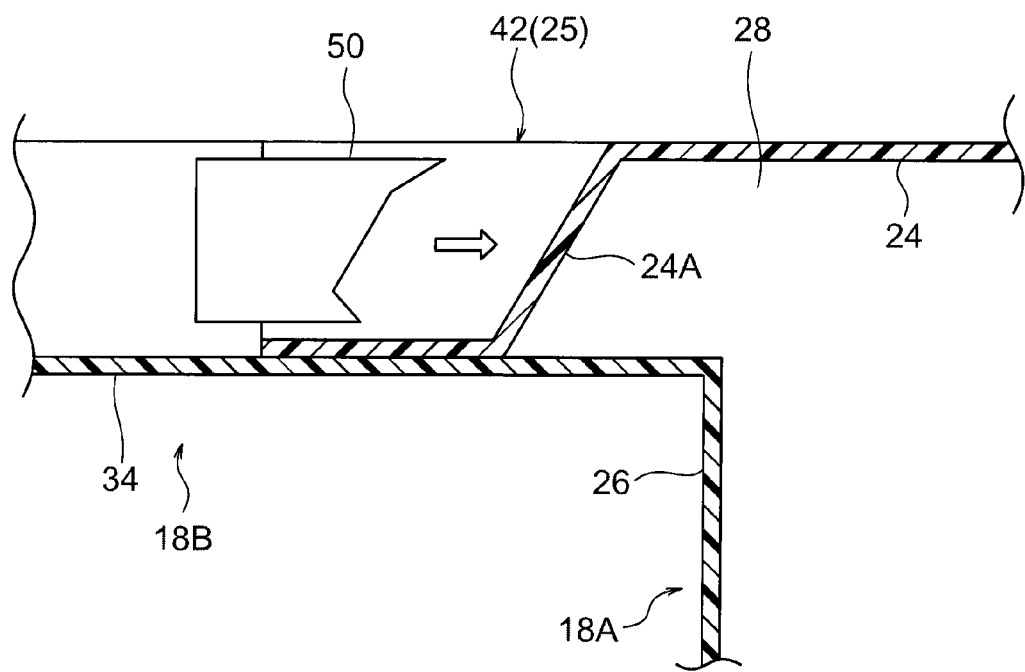
FIG. 8 is an enlarged sectional view showing a cut cross-section that is cut along line 8-8 of FIG. 7.

Note that the above-described communication holes 48 are formed in a post-process after the molding of the duct structural body 18 by the mold 12. Specifically, at the duct structural body 18 after molding, as shown in FIG. 7 and FIG. 8, wall portions 24A that face the inner sides of the hat-shaped cross-sectional portions 42 are provided at portions of the resin sheet 24 at the upper side, and the communication holes 48 are formed by removing all of or a portion of the wall portions 24A by burning-off by a heating blade 50 shown in FIG. 8. Note that this is not limited to the heating blade 50, and the communication holes 48 may be formed by another tool.

(Operation and Effects)

The operation and effects of the present first embodiment are described next.

At the duct-integral-type instrument panel structural body 10 relating to the present first embodiment, the blow molded portion 18A of the duct structural body 18 is molded by the pair of resin sheets 24, 26 being blow molded, and the vacuum molded portions 18B of the duct structural body 18 are molded by the one resin sheet 26 being vacuum molded at the outer sides of the blow molded portion 18A. Accordingly, the duct structural body 18 can be easily manufactured by blow molding and vacuum molding.

Further, because the blow molded portion 18A and the vacuum molded portions 18B are molded simultaneously by the mold 12, the duct structural body 18 can be manufactured extremely easily, the manufacturing processes can be simplified, and the manufacturing cost can be greatly reduced.

Moreover, at the duct structural body 18, the side duct main bodies 38 and the side defroster ducts 40 are formed with the vacuum molded portions 18B that are molded in hat shapes in cross-section, being joined to the reverse side of the instrument panel. Therefore, the materials of the side duct main bodies 38 and the side defroster ducts 40 can be reduced, and the cost and mass can be reduced.

Still further, at the duct structural body 18, because the defroster nozzle 28 and the center ducts 30 and the like that are provided at the blow molded portion 18A are molded in hollow shapes by blow molding, the design flexibility in the shapes of the defroster nozzle 28 and the center ducts 30 and the like are high. Due thereto, the flow adjusting portion 28A can be formed at the defroster nozzle 28 without adding another member, and therefore, the flow-rate-type defroster nozzle 28 can be employed while avoiding an increase in the manufacturing costs and the number of assembly processes. Due thereto, the clearing performance of the defroster can be improved at a low cost and while saving space.

Namely, in a case in which a flow adjusting portion is not provided at the defroster nozzle (in the case of a so-called static-pressure-type defroster nozzle), the air-conditioned air is blown-out from the front defroster blow-out ports by own static pressure of the air-conditioned air that has flowed into the defroster nozzle. In this case, the air-conditioned air is blown against a wide range of the front windshield glass, and, in order to improve the clearing performance of the defroster, the output (the amount of air) of the vehicle air conditioner must be increased, which leads to an increase in costs and an increase in size of the vehicle air conditioner.

In contrast, in the duct structural body 18 of the present embodiment, because the flow speed of the air-conditioned air increases at the flow adjusting portion 28A of the defroster nozzle 28, even in cases in which the output (the amount of air) of the vehicle air conditioner 16 is low, air-conditioned air can be blown against a wide range of the front windshield glass 36. Due thereto, a decrease in cost and a decrease in size of the vehicle air conditioner 16 can be realized.

Further, at the duct structural body 18, due to the communication holes 48 being formed in the resin sheet 24 at the upper side, the communicated state of the inner sides of the hat-shaped cross-sectional portions 42 and the defroster nozzle 28 interior is ensured, and the defroster nozzle 28 interior and the side defroster duct 40 interiors are communicated. Due thereto, a portion of the air-conditioned air that is supplied to the defroster nozzle 28 interior can be supplied to the side defroster duct 40 interiors. Further, because the hat-shaped cross-sectional portions 42 of the blow molded portion 18A are continuous with the hat-shaped cross-sections of the vacuum molded portions 18B, no seams arise between the both. Due thereto, the sealability of the side defroster ducts 40 can be made to be good.

Moreover, the hat-shaped cross-sectional portions 42, i.e., the mouths of the blow molded portion 18A that are continuous with the hat-shaped cross-sections of the vacuum molded portions 18B that configure the side defroster ducts 40 (the side defroster duct structural portions 34), are structured by the joined portions 25 of the pair of resin sheets 24, 26. Due thereto, the rigidity of the mouths of the blow molded portion 18A can be improved.

Further, the flange portions 42A of the hat-shaped cross-sectional portions 42 that are joined to the reverse side of the instrument panel 14 are structured by the joined portions 25 of the pair of resin sheets 24, 26. At the joined portions 25, the degrees of extensibility of the resin sheets 24, 26 at the time of blow molding are small and the plate thicknesses are ensured. Due thereto, the rigidity of the flange portions 42A of the hat-shaped cross-sectional portions 42 is ensured, and the sealability at the joined surfaces of the flange portions 42A of the hat-shaped cross-sectional portions 42 and the instrument panel 14 can be made preferable.

Figure 9:
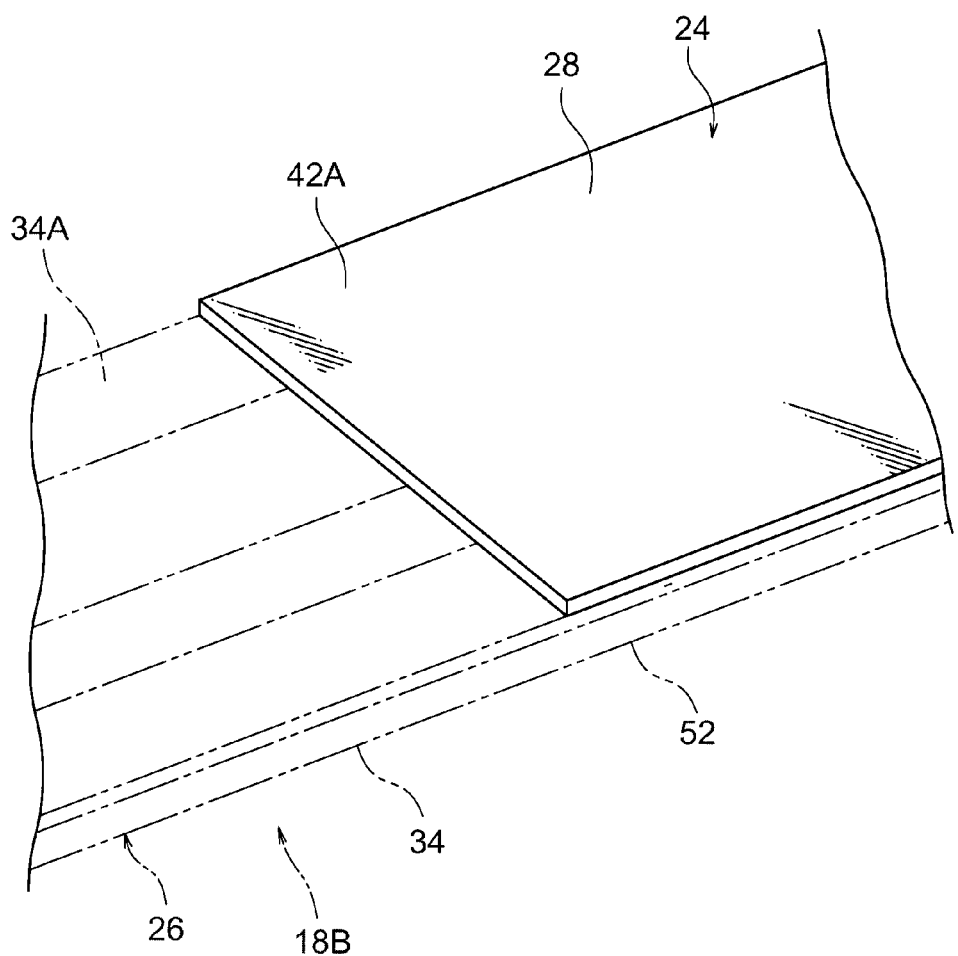
FIG. 9 is a perspective view showing a modified example of the hat-shaped cross-sectional portion relating to the first embodiment of the present invention.

Note that the above first embodiment describes a case in which the hat-shaped cross-sectional portions 42 are structured by the joined portions 25 of the pair of resin sheets 24, 26. However, the present invention is not limited to the same, and, as shown in FIG. 9, may be structured such that hat-shaped cross-sectional portions 52 are provided at only one resin sheet (here, the resin sheet 26 at the lower side).

Further, the first embodiment describes a case in which the duct structural body 18 is molded by the pair of resin sheets 24, 26 whose material and whose plate thickness before molding are the same. However, the present invention is not limited to the same, and may be structured by making at least one of the materials and the plate thicknesses before blow molding of the pair of resin sheets 24, 26 differ from one another. In such a case, the rigidity and extending moldability and the like of each region of the blow molded portion 18A can be set optimally in accordance with the needs. This point holds as well for the other embodiments of the present invention that are described below.

Other embodiments of the present invention are described next. Note that structures and operation that are basically similar to the above-described first embodiment are denoted by the same reference numerals as the above-described first embodiment, and description thereof is omitted.

<Second Embodiment>

Figure 10:
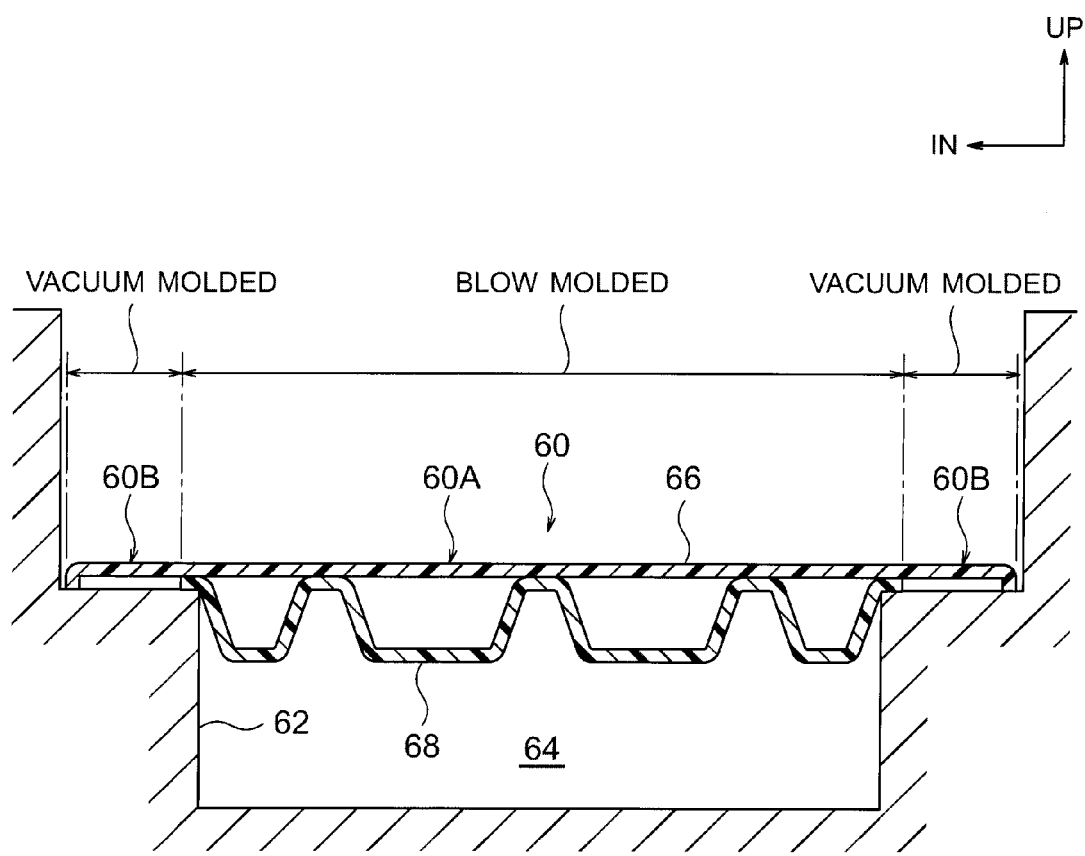
FIG. 10 is a schematic longitudinal sectional view showing a partial structure of a vehicle body rear portion that includes a deck board relating to a second embodiment of the present invention.

A partial structure of a vehicle body rear portion, that includes a deck board 60 serving as a vehicle interior part relating to a second embodiment of the present invention, is shown in a schematic longitudinal sectional view in FIG. 10. This deck board 60 structures the floor portion of the luggage compartment of the vehicle, and covers the upper end opening portion of a spare tire accommodating chamber 64 that is formed in the vehicle transverse direction central portion of a rear floor pan 62 of the vehicle body.

This deck board 60 is made by a manufacturing method that is similar to the duct structural body 18 relating to the above-described first embodiment, and has a blow molded portion 60A, that is molded in a hollow shape by a pair of resin sheets 66, 68 whose sizes are different being blow molded, and vacuum molded portions 60B, that are molded by the one resin sheet 66 being vacuum molded at the outer sides of the blow molded portion 60A.

At the left and right of the upper end opening portion of the spare tire accommodating chamber 64, the vacuum molded portions 60B, that are provided at the transverse direction both end sides of the deck board 60, abut the top surface of the rear floor pan 62 and are supported from the lower side by the rear floor pan 62. Further, the blow molded portion 60A, that is provided at the transverse direction central portion of the deck board 60, is formed by the resin sheet 66 at the upper side, that is formed in a flat-plate-shape, and the resin sheet 68 at the lower side, that is formed in recessed-and-protruding shapes in cross-section, being joined, and has plural closed cross-sections (hollow cross-sections) that are lined-up in parallel. This blow molded portion 60A is disposed so as to face and so as to be apart from the bottom wall of the spare tire accommodating chamber 64, and is supported at the rear floor pan 62 via the left and right vacuum molded portions 60B.

At the deck board 60 of the above-described structure, the blow molded portion 60A is molded by the pair of resin sheets 66, 68 being blow molded, and the vacuum molded portions 60B are molded by the one resin sheet 66 being vacuum molded at the outer sides of the blow molded portion 60A. Accordingly, the deck board 60 can be manufactured easily by blow molding and vacuum molding. Further, because the deck board 60 is provided with the hollow blow molded portion 60A, the design flexibility in the shape is high which is preferable.

Moreover, the regions that are supported from the lower side by the rear floor pan 62, i.e., the regions that do not require high rigidity, are molded simply by vacuum molding. Due thereto, a lightening of the weight of and a decrease in the cost of the deck board 60 can be realized. Further, the region that is supported at the rear floor pan 62 via the vacuum molded portions 60B, i.e., the region that is not directly supported at the vehicle body side and therefore requires rigidity, is molded by blow molding. Due thereto, the needed rigidity can be ensured by the hollow cross-section of the blow molded portion 60A.

Note that, in the above-described second embodiment, the vacuum molded portions 60B are structures that are directly supported by (abut) the rear floor pan 62. However, the present invention is not limited to the same, and may be structured such that the vacuum molded portions 60B are supported by the rear floor pan 62 via another resin member or the like that covers the surface of the rear floor pan 62.

<Third Embodiment>

Figure 11:
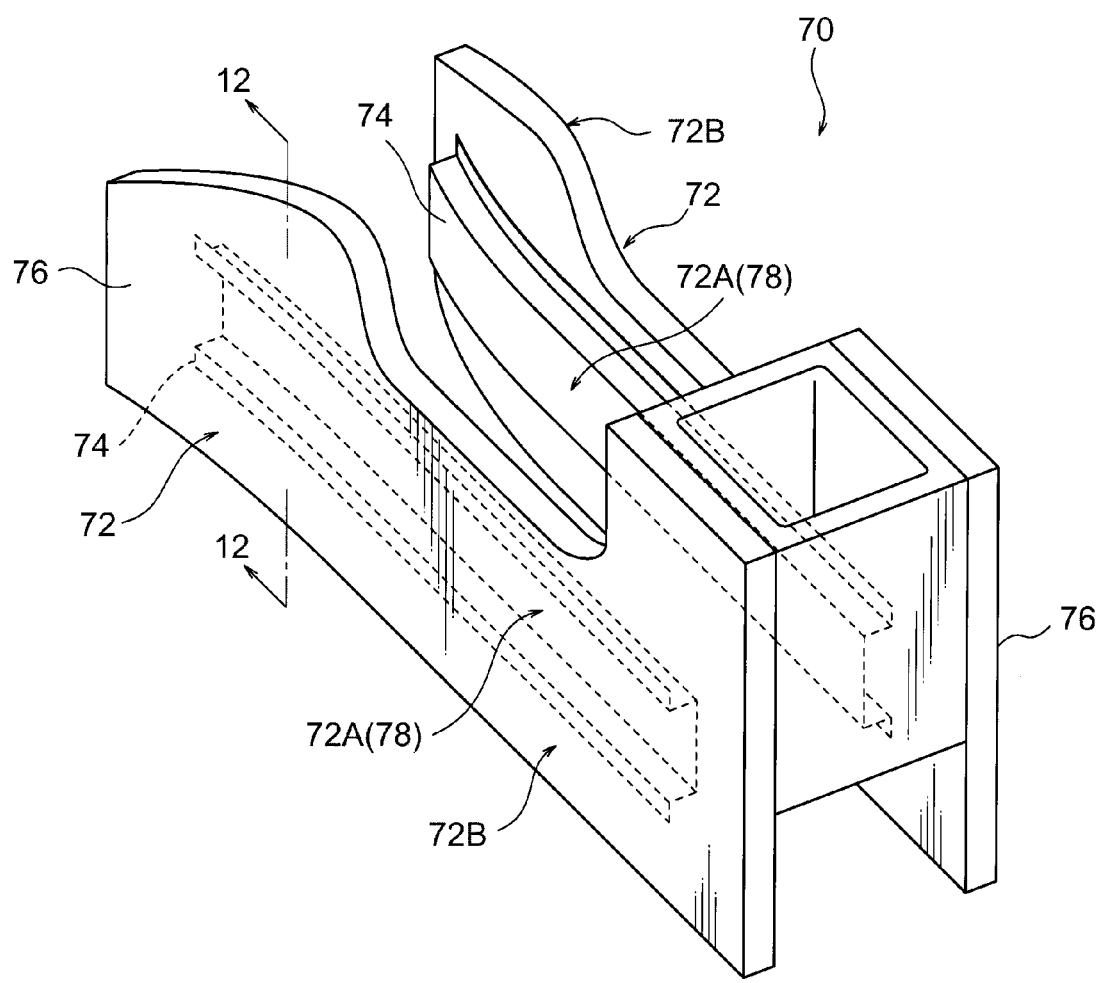
FIG. 11 is a schematic perspective view of a console box relating to a third embodiment of the present invention.

A console box 70 serving as a vehicle interior part relating to a third embodiment of the present invention is shown in a schematic perspective view in FIG. 11. Left and right console side panels 72 (side walls) of this console box 70 are made by a manufacturing method that is similar to the duct structural body 18 relating to the above-described first embodiment.

Figure 12:
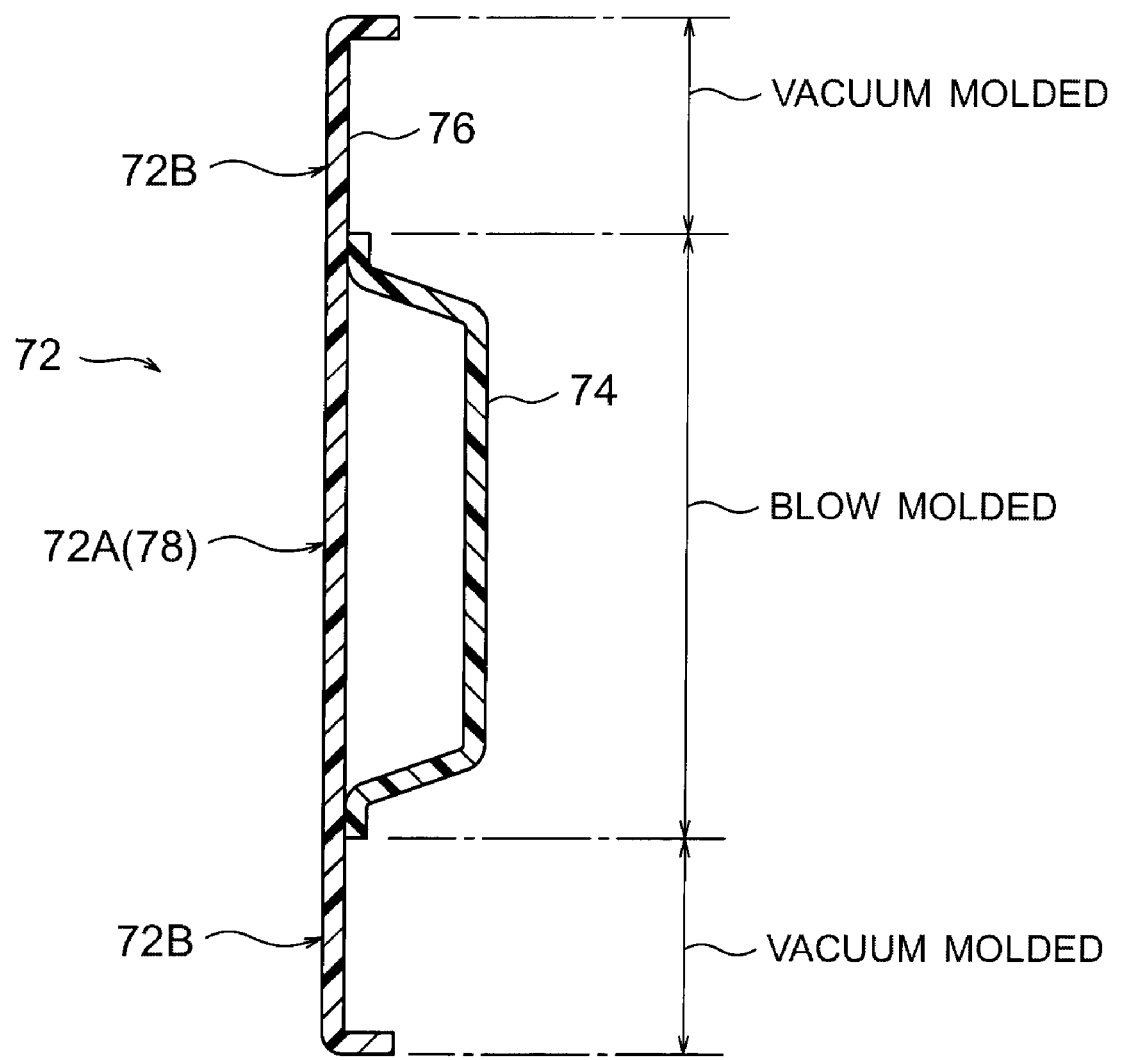
FIG. 12 is an enlarged sectional view showing a cut cross-section that is cut along line 12-12 of FIG. 11.

As shown in FIG. 12, the console side panel 72 has a blow molded portion 72A, that is molded in a hollow shape by a pair of resin sheets 74, 76 whose sizes are different being blow molded, and vacuum molded portions 72B that are molded by the one resin sheet 76 being vacuum molded at the outer sides of the blow molded portion 72A. At the vertical direction central portion of the console side panel 72, the blow molded portion 72A extends in the longitudinal direction of the console box 70 (the vehicle longitudinal direction in the state of being installed in the vehicle), and structures a duct portion 78 that is provided at the console side panel 72. The longitudinal direction both end portions of the duct portion 78 are open, and the duct portion 78 can lead air-conditioned air of a vehicle air conditioner toward the rear seat side of the vehicle cabin.

In the console box 70 of the above-described structure, the blow molded portion 72A is molded by the pair of resin sheets 74, 76 being blow molded, and the vacuum molded portions 72B are molded by the one resin sheet 76 being vacuum molded at the outer sides of the blow molded portion 72A. Accordingly, the console box 70 can be manufactured easily by blow molding and vacuum molding. Further, because the console box 70 has the blow molded portions 72A that are hollow, the design flexibility in shape is high which is preferable.

Moreover, because the duct portions 78 are structured by the blow molded portions 72A that structure the console side panels 72, the ducts can be made integral with the console side panels 72 in the molding of a single time. Due thereto, the number of parts and number of assembly processes can be reduced, and simplification of the manufacturing process can be realized, and therefore, the manufacturing costs can be greatly reduced. Moreover, due to the hollow cross-sections of the blow molded portions 72A (the duct portions 78), the lateral rigidity of the console side panels 72 also can be improved.

Note that the above respective embodiments describe cases in which the present invention is applied to the duct-integral-type instrument panel structural body 10, the deck board 60, and the console box 70. However, the present invention is not limited to these, and can be applied to a vehicle interior part that has a hollow portion.

In addition, the present invention can be embodied by making various changes within a range that does not device from the gist thereof. Further, it goes without saying that the scope of the right of the present invention is not limited by the above-described respective embodiments.

What is claimed is:

1. A vehicle interior part comprising:
   a blow molded portion that is molded in a hollow shape by a pair of resin sheets being blow molded and that includes joined portions of the pair of resin sheets, and
   vacuum molded portions that are molded by one of the pair of resin sheets being vacuum molded at outer sides of the blow molded portion;
   wherein the vacuum molded portions are molded in hat shapes in cross-section and opening sides of the hat shapes in cross-section are configured to be joined to a reverse side of an instrument panel; and
   wherein the one of the pair of resin sheets which forms the vacuum molded portions and is configured to be joined to the reverse side of the instrument panel is located underneath another of the pair of resin sheets.

2. The vehicle interior part of claim 1, wherein the blow molded portion and the vacuum molded portions are molded simultaneously.

3. The vehicle interior part of claim 1, wherein at least one of a material and a plate thickness before blow molding of the pair of resin sheets is different from each other.

4. The vehicle interior part of claim 1, wherein a width dimension of the another of the pair of resin sheets is set to be smaller than that of the one of the pair of resin sheets.

5. The vehicle interior part of claim 1, comprising an instrument panel, wherein the vacuum molded portions are formed in hat shapes in cross-section that open upward, and flange portions are provided at opening sides, and the flange portions are joined to a reverse surface of the instrument panel.

6. The vehicle interior part of claim 1, wherein a non-woven fabric is joined to the another of the pair of resin sheets at a surface thereof at the side of the one of the pair of resin sheets.

7. The vehicle interior part of claim 1, further comprising an instrument panel, wherein the opening sides of the hat shapes in cross-section are joined to a reverse side of the instrument panel, and, together with the instrument panel, form side duct portions that lead air-conditioned air of a vehicle air conditioner to transverse direction end sides of a vehicle cabin; and wherein the blow molded portion has a defroster nozzle and a center duct, the defroster nozzle leading the air-conditioned air to a front windshield glass and the center duct leading the air-conditioned air to a transverse direction central side of the vehicle cabin.

8. The vehicle interior part of claim 7, wherein the opening sides of the vacuum molded portions are joined to the reverse side of the instrument panel via sheet-shaped sealing members that are heat insulating.

9. The vehicle interior part of claim 7, wherein hat-shaped cross-sectional portions are provided at end sides of the blow molded portion, the hat-shaped cross-sectional portions being molded in hat shapes in cross-section and being continuous with the hat-shapes in cross-sections of the vacuum molded portions, and a blow molded portion interior and side duct portion interiors are communicated via the hat-shaped cross-sectional portions.

10. The vehicle interior part of claim 9, wherein the hat-shaped cross-sectional portions are structured by joined portions of the pair of resin sheets, and communication holes, for communicating the blow molded portion interior and the side duct portion interiors, are formed in the another of the pair of resin sheets at regions adjacent to the hat-shaped cross-sectional portions.

11. The vehicle interior part of claim 10, wherein flange portions, which are provided at opening sides of the hat-shaped cross-sectional portions, are joined to the reverse side of the instrument panel.

\* \* \* \* \*